April 7, 1925.  L. A. PAINE  1,532,438
GRAPHIC ELECTRIC METER
Filed Aug. 27, 1921
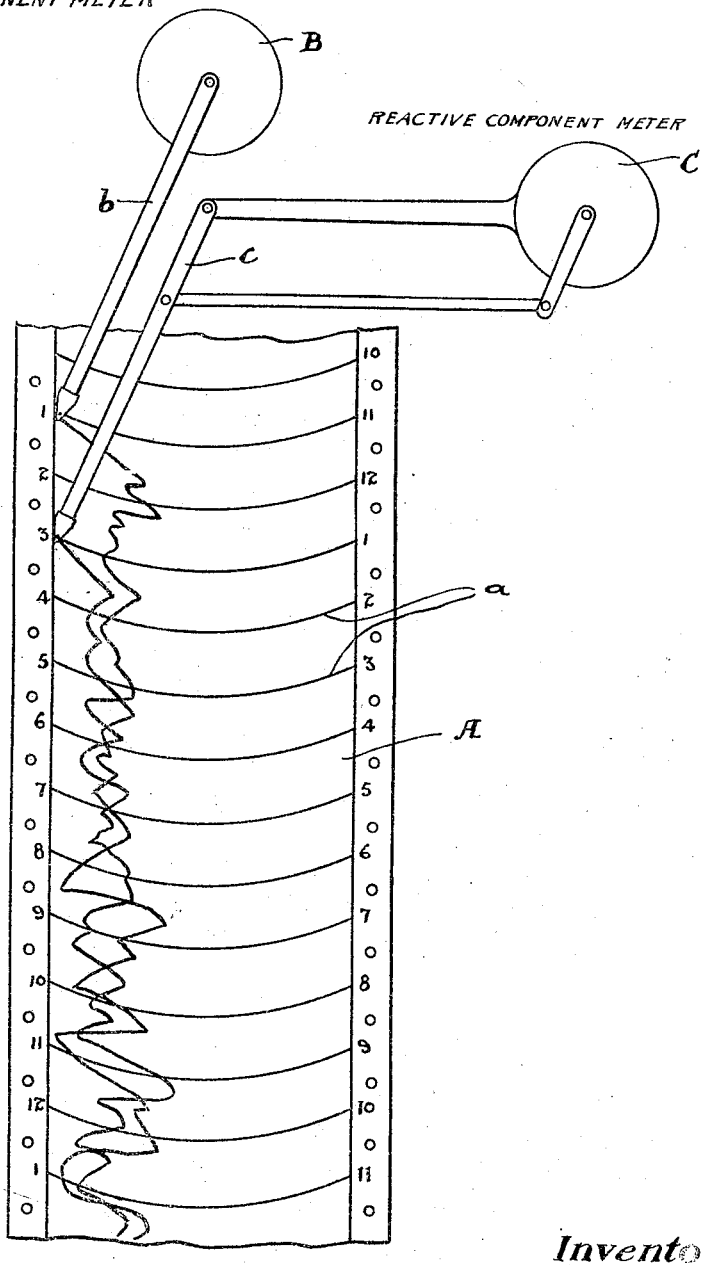
Inventor.
Louis A. Paine Patented Apr. 7, 1925.

1,532,438

UNITED STATES PATENT OFFICE.

LOUIS A. PAINE, OF TORONTO, ONTARIO, CANADA, ASSIGNOR TO LINCOLN METER COMPANY LIMITED, OF TORONTO, ONTARIO, CANADA.

GRAPHIC ELECTRIC METER.

Application filed August 27, 1921. Serial No. 496,159.

*To all whom it may concern:*

Be it known that I, LOUIS A. PAINE, a citizen of the United States of America, and resident of the city of Toronto, county of York, Province of Ontario, in the Dominion of Canada, have invented certain new and useful Improvements in Graphic Electric Meters, described in the following specification and illustrated in the accompanying drawings, that form part of the same.

The principal object of this invention is to enable an accurate knowledge being obtained of the volt amperes as well as the watts that are being absorbed by an electrical equipment in order that fair rates may be established in charging for service, and to provide a reliable form of meter from which a calculation of volt amperes may be readily obtained.

Various methods of measuring volt amperes have been proposed but so far no instrument has been produced which would give the desired result. The most effective method has been to measure the watts of an alternating current with one meter and the reactive component with another meter but the difficulty has been to obtain the accurate vector sum of these measurements.

The principal feature of this invention consists in the novel manner of recording the readings of a watt meter and a meter arranged to indicate the reactive component whereby both meters operate individual recording pens to indicate simultaneously upon a common moving chart, the pens moving independently and the chart being indicated with a time scale.

The drawing is a diagrammatic view of an apparatus for carrying this invention into effect.

In order to obtain the vector sum of the measurements of meters measuring separately the watts and the reactive component, this invention utilizes a time operated moving chart A here shown in strip form and having regular divisions $a$ in the form of transversely curved lines. These divisions are numbered 1, 2, 3, 4 etc., on both sides and the numbers on one side are arranged two divisions in advance of the numbers on the other side, that is to say No. 3 on one side is opposite to No. 1 on the other side.

Superposed in relation to this chart is a watt meter B which operates an indicator pen carrying arm $b$, the pen engaging the surface of the chart. A reactive K. V. A. meter C also superposed in relation to the chart is provided with a pen carrying arm $c$ engaging the surface of the chart. These meters are so arranged that the pen arms operate entirely independent of each other and have a full range over the surface of the chart, the chart being preferably arranged upon a drum.

It will be seen that a record of the watts and of the reactive volt amperes will be made by the two pens, the one being arranged a certain fixed longitudinal distance from the other, which distance is equal to the variations of the markings or numbers on the sides.

In order to instantaneously distinguish between the markings of these pens, it will be desirable to utilize two colours of ink and the time markings on the sides may be coloured to correspond.

It has been the practice in the past to use recording watt meters and reactive volt ampere meters and the two charts have been compared but the difficulty has been to ensure that the time selected on each chart corresponded exactly the one to the other. A slight error in the comparison of the time value of two entirely separate charts might make a vital difference in the quantity being determined and to take charts from two entirely separate instruments it is practically impossible to be sure that the time values are properly comparable.

By utilizing a single chart as herein proposed and having both meters operating simultaneously the time spacing between the two pens is accurately fixed and always remains the same independent of any errors and in the practical working out of the invention it will be impossible to get charts mixed, that is to get a chart of one date confused with another.

It is preferable to use all meters of the thermal type in carrying this invention into effect as such meters do not respond instantaneously to variations of load but indicate the average flow of energy for a given period. This permits the paper to travel under the pen without the possibility of smearing the ink where the ordinary type of graphic meter would not operate successfully.

With the use of a recording device such as herein described, it is possible to obtain knowledge of the volt amperes of an alternating current circuit and also, which is frequently highly desirable, it is possible to ascertain the two components which go to make up the calculation. For instance, the volt amperes of a circuit carrying 1000 watts superimposed on 100 reactive volt amperes is exactly the same as another circuit carrying 100 watts superimposed upon 1000 reactive volt amperes. A device which measures only volt amperes as a single quantity could not distinguish between these two conditions. The corrective measures which should be applied to an alternating current circuit would depend greatly on the relative value of the watts and the reactive volt amperes, consequently this information is extremely important to obtain and it is accomplished in a very simple manner.

What I claim as my invention is:—

In a graphic meter, the combination with a moving chart having transversely arranged spaced divisions, of a watt meter having a rotatable arm adapted to swing across the chart and a re-active volt ampere meter having a rotatable arm adapted to swing across the chart, said arms being adapted to operate and mark said chart in a longitudinal spaced relation.

LOUIS A. PAINE.